United States Patent
Patil et al.

(10) Patent No.: US 10,656,237 B2
(45) Date of Patent: May 19, 2020

(54) DETECTION OF MOBILE WIRELESS TERMINALS IN CROWDSOURCED DATA

(71) Applicant: QUALCOMM Incorporated, San Diego, CA (US)

(72) Inventors: Milind Patil, Mountain View, CA (US); Aditya Narain Srivastava, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/169,526

(22) Filed: Oct. 24, 2018

(65) Prior Publication Data

US 2019/0128996 A1    May 2, 2019

Related U.S. Application Data

(60) Provisional application No. 62/578,912, filed on Oct. 30, 2017.

(51) Int. Cl.
| | | |
|---|---|---|
| *G01S 5/02* | (2010.01) |
| *H04B 17/27* | (2015.01) |
| *H04W 64/00* | (2009.01) |
| *H04B 17/364* | (2015.01) |
| *H04W 4/02* | (2018.01) |
| *H04W 76/11* | (2018.01) |

(52) U.S. Cl.
CPC .......... *G01S 5/0289* (2013.01); *G01S 5/021* (2013.01); *G01S 5/0252* (2013.01); *H04B 17/27* (2015.01); *H04B 17/364* (2015.01); *H04W 4/023* (2013.01); *H04W 64/003* (2013.01); *H04W 76/11* (2018.02)

(58) Field of Classification Search
CPC ... G01S 5/0289; G01S 5/0252; H04B 17/364; H04W 76/11; H04W 4/023; H04W 64/003
See application file for complete search history.

(56) References Cited

U.S. PATENT DOCUMENTS

| | | | |
|---|---|---|---|
| 9,853,939 B1 * | 12/2017 | Chen | H04L 61/6022 |
| 2009/0088182 A1 * | 4/2009 | Piersol | H04W 48/12 |
| | | | 455/456.1 |
| 2014/0036768 A1 * | 2/2014 | Gao | H04W 48/16 |
| | | | 370/328 |

(Continued)

OTHER PUBLICATIONS

International Search Report and Written Opinion—PCT/US2018/057838—ISA/EPO—dated Dec. 17, 2018.

*Primary Examiner* — Christopher M Brandt
(74) *Attorney, Agent, or Firm* — Paradice and Li LLP

(57) ABSTRACT

A mobile wireless transmitter is detected from location data received for a plurality of wireless transmitters obtained through crowdsourcing or wardriving. Location data is held until sufficient time or enough location data is collected from which movement of a wireless transmitter can be detected. Sets of measurement data for each wireless transmitter are determined from the collected location data. The sets of measurement data may include, e.g., Service Set Identifier (SSID), a round trip time (RTT) variance, and/or a neighbor relationship graph for each wireless transmitter. The mobile wireless transmitter is identified from the sets of measurement data. An almanac database may then be published in which any mobile wireless transmitters are identified or excluded.

16 Claims, 3 Drawing Sheets

(56) References Cited

U.S. PATENT DOCUMENTS

| | | | | |
|---|---|---|---|---|
| 2015/0111527 A1* | 4/2015 | Michaelis | ............... | H04W 4/90 455/404.2 |
| 2015/0341894 A1* | 11/2015 | Rowitch | ............... | H04W 4/025 455/456.1 |
| 2015/0350943 A1* | 12/2015 | Wirola | .................. | H04W 64/00 370/252 |
| 2018/0337866 A1* | 11/2018 | Jung | ....................... | H04L 47/34 |

* cited by examiner

DETECTION OF MOBILE WIRELESS TERMINALS IN CROWDSOURCED DATA

CLAIM OF PRIORITY UNDER 35 U.S.C. § 119

This application claims under 35 USC § 119 the benefit of and priority to U.S. Provisional Application No. 62/578,912, filed Oct. 30, 2017, and entitled "DETECTION OF MOBILE WIRELESS TERMINALS IN CROWDSOURCED DATA," which is assigned to the assignee hereof and is incorporated herein by reference in its entirety.

BACKGROUND

Position location systems for mobile devices in satellite positioning challenged/denied areas may use positioning based on signals from local wireless transmitters, such as cell towers or base stations for cellular wireless networks, access points for wireless local area networks (WLANs) or wireless personal area networks (WPANs), etc. Positioning using wireless transmitters conventionally requires an assistance server that can provide an almanac that contains the locations of the wireless transmitters.

Conventionally, almanac databases are built using crowdsourcing, wardriving and/or a combination of both. Crowdsourcing and wardriving require that multiple mobile devices collect data related to the location of the wireless transmitters and submit the collected data to a centrally located server. The server combines the collected data from multiple users to generate the almanac database that includes the locations of the wireless transmitters. In order to use wireless transmitters for positioning, a mobile device accesses the almanac database through the server, or different servers, and uses the locations for visible wireless transmitters to determine the position of the mobile device.

A source of error when generating the almanac database is the inclusion of wireless transmitters that do not have a fixed or static location. For example, crowdsourcing or wardriving may collect and forward to the server location related data for mobile wireless transmitters, such as mobile hotspot access points, mobile Bluetooth tags or mobile cell tower identifies. Inclusion of mobile wireless transmitters in the almanac database may result in location errors if these mobile wireless transmitters are used to compute a position fix after the mobile wireless transmitters have moved.

SUMMARY

A mobile wireless transmitter is detected from location data received for a plurality of wireless transmitters obtained through crowdsourcing or wardriving. Location data is held until sufficient time or enough location data is collected from which movement of a wireless transmitter can be detected. Sets of measurement data for each wireless transmitter are determined from the collected location data. The sets of measurement data may include, e.g., Service Set Identifier (SSID), a round trip time (RTIT) variance, and/or a neighbor relationship graph for each wireless transmitter. The mobile wireless transmitter is identified from the sets of measurement data. An almanac database may then be published in which any mobile wireless transmitters are identified or excluded.

In one aspect, a method for producing an almanac database of wireless transmitters includes receiving location data for a plurality of wireless transmitters, the location data obtained from a plurality of mobile devices through crowdsourcing or wardriving; holding the location data while receiving additional location data for the plurality of wireless transmitters for a period of time; generating sets of measurement data for each wireless transmitter in the plurality of wireless transmitters using the location data and the additional location data received for the plurality of wireless transmitters, wherein the sets of measurement data for each wireless transmitter comprise at least one of a Service Set Identifier (SSID) for each wireless transmitter, a round trip time (RTI) variance for each wireless transmitter, and a neighbor relationship graph for each wireless transmitter; identifying a mobile wireless transmitter in the plurality of wireless transmitters using at least the SSID for each wireless transmitter, the RTI variance for each mobile wireless transmitter, and the neighbor relationship graph for each wireless transmitter; and publishing the almanac database after the period of time using the location data and the additional location data received for the plurality of wireless transmitters, wherein the almanac database identifies the mobile wireless transmitter or excludes the mobile wireless transmitter.

In one aspect, an apparatus for producing an almanac database of wireless transmitters includes an external interface capable of communicating with a plurality of mobile devices; a memory to store instructions; and at least one processor coupled to the external interface and the memory and configured to: receive location data for a plurality of wireless transmitters, the location data obtained from the plurality of mobile devices through crowdsourcing or wardriving; hold the location data while receiving additional location data for the plurality of wireless transmitters for a period of time; generate sets of measurement data for each wireless transmitter in the plurality of wireless transmitters using the location data and the additional location data received for the plurality of wireless transmitters, wherein the sets of measurement data for each wireless transmitter comprise at least one of a Service Set Identifier (SSID) for each wireless transmitter, a round trip time (RIT) variance for each wireless transmitter, and a neighbor relationship graph for each wireless transmitter, identify a mobile wireless transmitter in the plurality of wireless transmitters using at least the SSID for each wireless transmitter, the RTT variance for each mobile wireless transmitter, and the neighbor relationship graph for each wireless transmitter; and publish the almanac database after the period of time using the location data and the additional location data received for the plurality of wireless transmitters, wherein the almanac database identifies the mobile wireless transmitter or excludes the mobile wireless transmitter.

In one aspect, an apparatus for producing an almanac database of wireless transmitters includes means for receiving location data for a plurality of wireless transmitters, the location data obtained from a plurality of mobile devices through crowdsourcing or wardriving; means for holding the location data while receiving additional location data for the plurality of wireless transmitters for a period of time; means for generating sets of measurement data for each wireless transmitter in the plurality of wireless transmitters using the location data and the additional location data received for the plurality of wireless transmitters, wherein the sets of measurement data for each wireless transmitter comprise at least one of a Service Set Identifier (SSID) for each wireless transmitter, a round trip time (RIT) variance for each wireless transmitter, and a neighbor relationship graph for each wireless transmitter, means for identifying a mobile wireless transmitter in the plurality of wireless transmitters using at least the SSID for each wireless transmitter, the RTT variance for each mobile wireless transmitter, and the neighbor relationship graph for each wireless transmitter; and means for publishing the almanac database after the period of time using the location data and the additional location data received for the plurality of wireless transmitters, wherein the almanac database identifies the mobile wireless transmitter or excludes the mobile wireless transmitter.

In one aspect, a storage medium including program code stored thereon, the program code is operable to cause at least one processor producing an almanac database of wireless transmitters to perform receiving location data for a plurality of wireless transmitters, the location data obtained from a plurality of mobile devices through crowdsourcing or wardriving; holding the location data while receiving additional location data for the plurality of wireless transmitters for a period of time; generating sets of measurement data for each wireless transmitter in the plurality of wireless transmitters using the location data and the additional location data received for the plurality of wireless transmitters, wherein the sets of measurement data for each wireless transmitter comprise at least one of a Service Set Identifier (SSID) for each wireless transmitter, a round trip time (RT) variance for each wireless transmitter, and a neighbor relationship graph for each wireless transmitter, identifying a mobile wireless transmitter in the plurality of wireless transmitters using at least the SSID for each wireless transmitter, the RTT variance for each mobile wireless transmitter, and the neighbor relationship graph for each wireless transmitter, and publishing the almanac database after the period of time using the location data and the additional location data received for the plurality of wireless transmitters, wherein the almanac database identifies the mobile wireless transmitter or excludes the mobile wireless transmitter.

DETAILED DESCRIPTION

Figure 1:
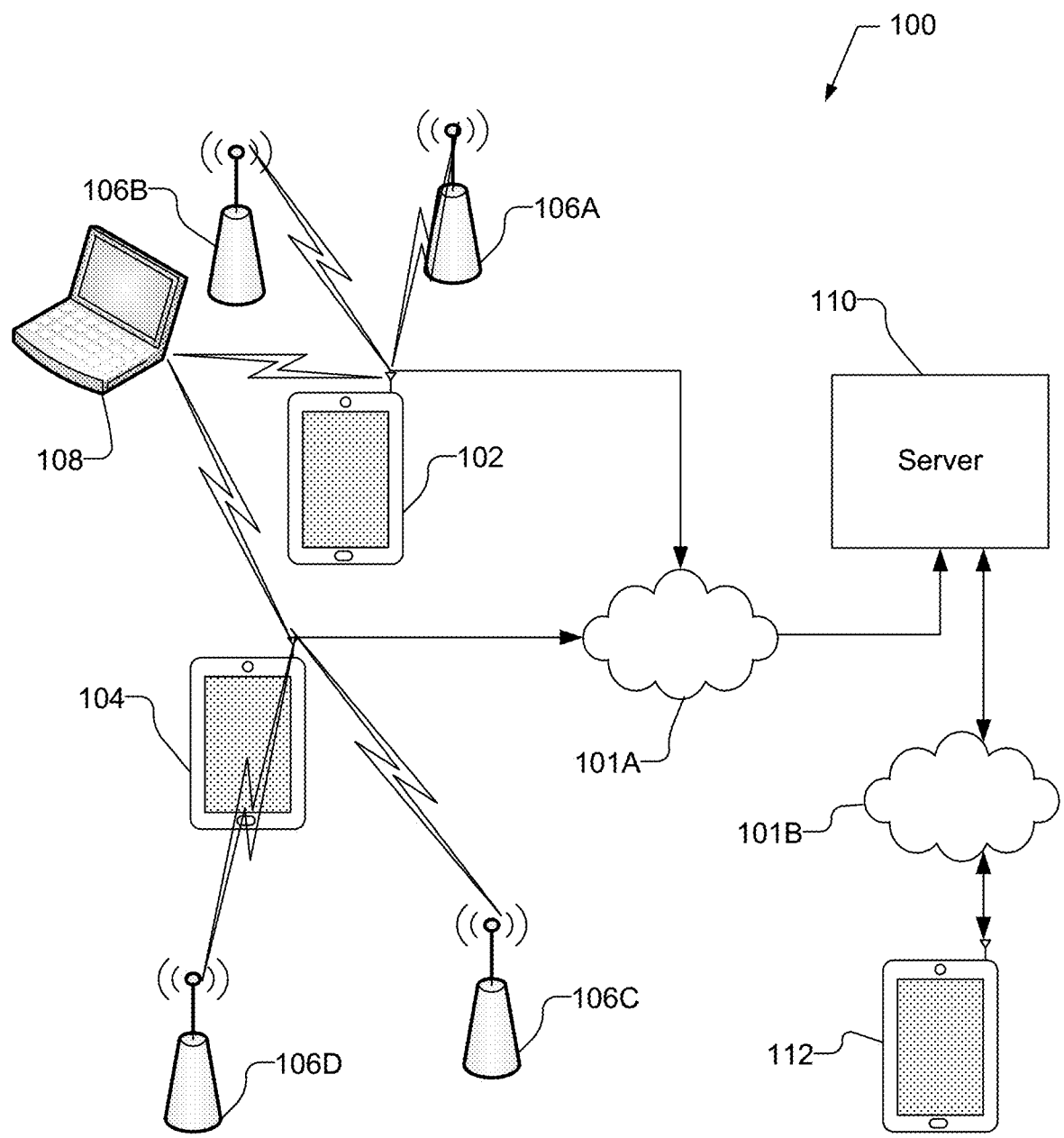
FIG. 1 illustrates a system with a distributed architecture that provides the location of wireless transmitters to mobile devices for positioning, where the locations are determined from at least one of crowdsourcing and wardriving.

FIG. 1 illustrates a system 100 with a distributed architecture that provides the location of wireless transmitters to mobile devices for positioning, where the locations are determined from at least one of crowdsourcing and wardriving. System 100 is illustrated with a plurality of mobile devices 102 and 104 that are in communication with a server 110 via a wireless network 101A. Mobile devices 102 and 104 may provide server 110 with information regarding any visible wireless transmitters 106A, 106B, 106C, 106D (sometimes collectively referred to as wireless transmitters 106) and mobile wireless transmitter 108, illustrated as a laptop. Wireless transmitters 106 and 108 may be, e.g., cell towers or base stations for cellular wireless networks, access points for wireless local area networks (WLANs) or wireless personal area networks (WPANs), or any other terrestrial wireless transmitters that may be used by a mobile device for positioning. Wireless transmitters 106 have fixed or static locations, while wireless transmitter 108 is a mobile wireless transmitter, such as a hotspot on a handset or laptop or Bluetooth tags or Cell Tower on Wheels (COW). The mobile devices 102 and 104 may communicate with server 110 through a wireless network 101A using wireless transmitters 106, 108 or other wireless transmitters (not shown).

Server 110 aggregates data related to the location of wireless transmitters 106 and 108 that is collected via crowdsourced and/or wardriving from multiple mobile devices, as is well known, to produce a database of wireless transmitters and their associated locations. The data related to location of the wireless transmitters may include, e.g., known locations of mobile devices, received signal strength indicator (RSSI) measurements and/or round trip time (RIT) measurements for wireless transmitters, and any other data that may be used to determine the location of the wireless transmitters, and is accordingly sometimes referred to herein as "location data."

As illustrated in FIG. 1, the server 110 may communicate with a mobile device 112 through a wireless network 101B, which may be same or different than the wireless network 101A. The server 110 (or a different server, not shown) may communicate with the mobile device 112 to provide or use the database or a portion of the database of the location data for the wireless transmitters 106, 108 to the mobile device 112 for position determination of the mobile device.

The wireless terminals 106, may be may be part of a wireless wide area network ("WWAN"), a wireless local area network ("WLAN"), a wireless personal area network (WPAN). The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

The mobile devices 102, 104, and 112 may be referred to as a device, a wireless device, a mobile terminal, a terminal, a mobile station (MS), a user equipment (UE), a SUPL Enabled Terminal (SET) or by some other name and may correspond to a cellphone, smartphone, laptop, tablet, PDA, tracking device or some other portable or moveable device. Typically, though not necessarily, a mobile device may support wireless communication such as using GSM, WCDMA, LTE, CDMA, HRPD, WiFi, BT, WiMax, etc. A mobile device may also support wireless communication using a wireless LAN (WLAN), DSL or packet cable for example. A mobile device may comprise a single entity or may comprise multiple entities such as in a personal area network where a user may employ audio, video and/or data I/O devices and/or body sensors and a separate wireline or wireless modem. An estimate of a location of a mobile device (e.g., mobile device 112) may be referred to as a location, location estimate, location fix, fix, position, position estimate or position fix, and may be geographic, thus providing location coordinates for the mobile device (e.g., latitude and longitude) which may or may not include an altitude component (e.g., height above sea level, height above or depth below ground level, floor level or basement level). Alternatively, a location of a mobile device may be expressed as a civic location (e.g., as a postal address or the designation of some point or small area in a building such as a particular room or floor). A location of a mobile device may also be expressed as an area or volume (defined either geographically or in civic form) within which the mobile device is expected to be located with some probability or confidence level (e.g., 67% or 95%). A location of a mobile device may further be a relative location comprising, for example, a distance and direction or relative X, Y (and Z) coordinates defined relative to some origin at a known location which may be defined geographically or in civic terms or by reference to a point, area or volume indicated on a map, floor plan or building plan. In the description contained herein, the use of the term location may comprise any of these variants unless indicated otherwise.

The mobile wireless transmitter 108 is illustrated as a laptop in FIG. 1, but may be any mobile wireless transmitter, such as mobile hotspot access points, e.g., handset or laptop, mobile Bluetooth tags or mobile cell tower identifies, such as Cell Tower on Wheels (COW), or any other mobile terrestrial wireless transmitter. Inclusion of the mobile wireless transmitter 108 in the almanac database by server 110, however, may result in the corruption of the almanac database which may impact the services that use the almanac database. For example, there may be large errors in the calculated position of mobile device 112 if the position of the mobile device 112 is determined using the location data associated with mobile wireless transmitter 108 after mobile wireless transmitter 108 has moved. The inclusion of mobile wireless transmitters reduces the reliability of the almanac database.

Figure 2:
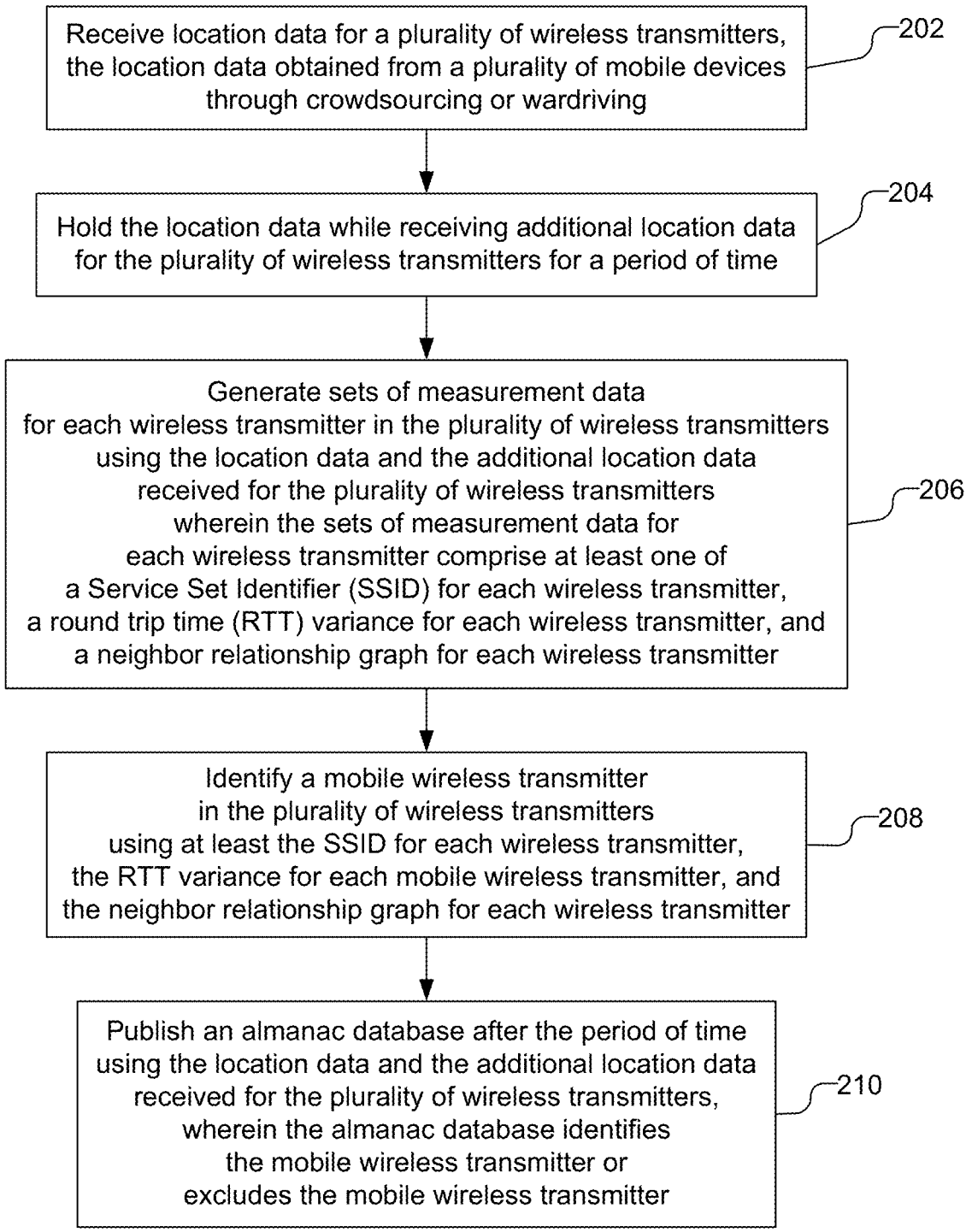
FIG. 2 illustrates a flow chart illustrating a method of eliminating mobile wireless transmitters from crowdsourced or wardriving data.

Accordingly, to improve reliability, server 110 may eliminate mobile wireless transmitters, such as the mobile wireless transmitter 108, from the almanac database. FIG. 2 illustrates a flow chart illustrating a method of identifying and flagging or excluding mobile wireless transmitters collected via crowdsourcing or wardriving from an almanac database. The process of identifying wireless transmitters as mobile and eliminating the mobile wireless transmitters from crowdsourced or wardriving data may be performed by server 110 or a mobile device, such as mobile device 102.

As illustrated, location data is received for a plurality of wireless transmitters, the location data is obtained from a plurality of mobile devices through crowdsourcing or wardriving (202). The location data may be held while receiving additional location data for the plurality of wireless transmitters for a period of time (204). For example, the location data may be held, e.g., stored without using the data to publish an almanac database, for a predetermined time period or held until a threshold amount of data is received, which increases the likelihood that the location data will indicate movement of any mobile wireless transmitters.

Sets of measurement data are generated for each wireless transmitter in the plurality of wireless transmitters using the location data and the additional location data received for the plurality of wireless transmitters, wherein the sets of measurement data for each wireless transmitter comprise at least one of a Service Set Identifier (SSID) for each wireless transmitter, a round trip time (RTT) variance for each wireless transmitter, and a neighbor relationship graph for each wireless transmitter (206).

A mobile wireless transmitter in the plurality of wireless transmitters is identified using at least the SSID for each wireless transmitter, the RTT variance for each mobile wireless transmitter, and the neighbor relationship graph for each wireless transmitter (208). A server may publish an almanac database after the period of time using the location data and the additional location data received for the plurality of wireless transmitters, wherein the almanac database identifies the mobile wireless transmitter or excludes the mobile wireless transmitter (210). For example, the server 110 may generate or add to an almanac database for the wireless transmitters, wherein the mobile wireless transmitter is either identified as mobile or excluded, and may communicate with the mobile device 112 to provide the almanac database (or a portion thereof) or may use the almanac database (or a portion thereof) for position determination of the mobile device.

By holding the location data for a period of time before generating the sets of measurement data with which a wireless transmitter may be identified as mobile, it is more likely that the collected location data from any mobile wireless transmitters will indicate movement of the wireless transmitters. Accordingly, the mobile wireless transmitters may be identified from sets of measurement data and either flagged (e.g., identified) or excluded from the almanac database to improve the reliability of the almanac database, e.g., so that location information for mobile wireless transmitters is not in appropriately relied upon during position determination of a mobile device.

In one implementation, the sets of measurement data for each wireless transmitter may be generated by obtaining the SSID for each wireless transmitter from the location data and the additional location data. The mobile wireless transmitter may then be identified, e.g., by determining the SSID for a wireless transmitter identifies that wireless transmitter as a mobile Hotspot. For example, the SSID may include the term Hotspot, or may include another identification that is known to be used to identify Hotspots.

By way of example, SSID based mobile wireless transmitter detection may be performed using a two-step Machine Learning process including a learning/model building step and a machine learning inference process step. In the first step, labelled data (truth reference) may be used to train a ML (Machine Learning) model to determine whether a wireless transmitter is mobile or not based on the SSID name. The labelled data may have a specific format, such as: [SSID|True Mobility Status of AP (1/0)] as is collected as a true reference to train. The labelled data, for example, may be based on empirical observations that a large number of mobile wireless transmitters exhibit common keywords in their SSIDs. As an example, keywords such as "hotspot," or "phone," or names of cars, names of phone vendors/phone models, and other such patterns may be used. The model learns about these keyword associations by using a large set of collected labelled (truth) data. The keywords may be learned in a language independent fashion, i.e., non-English language SSID names may also be trained.

In the second step, the machine learning inference process is used to identify mobile wireless transmitters by feeding SSID names in real time to a trained model from step 1.

Model outputs may be a probability value ([0 . . . 1]) based on the SSID name provided indicating how likely the wireless transmitter is a mobile wireless transmitter. This serves as an independent source of mobility detection (from common geotagging schemes) and boosts the confidence in mobile wireless transmitter detection by combining with geotagging mobile wireless transmitter detection mechanisms.

In one implementation, the sets of measurement data for each wireless transmitter may be generated by generating the RTT variance for each wireless transmitter from the location data and the additional location data. The mobile wireless transmitter may be identified by determining that the RTT variance for a wireless transmitter indicates that the wireless transmitter is mobile. For example, the RTT variance for the wireless transmitter, e.g., with respect to a known static end, may indicate that the wireless transmitter is mobile if it is greater than a predetermined threshold.

In one implementation, the sets of measurement data for each wireless transmitter may be generated by generating the neighbor relationship graph for each wireless transmitter from the location data and the additional location data and determining a spread of the neighbor relationship graph for each wireless transmitter. The mobile wireless transmitter may be identified by determining the spread of the neighbor relationship graph for a wireless transmitter indicates that the wireless transmitter is mobile. For example, the spread of the neighbor relationship graph for the wireless transmitter may indicate that the wireless transmitter is mobile if it is greater than a predetermined threshold.

The mobile wireless transmitter detection based on neighbor relations may be detected using neighbor relations by the server 110, i.e., server based detection, or by a mobile device, e.g., mobile device 102, i.e., client based detection. In server based detection of a mobile wireless transmitter using neighbor relationships, the server may aggregate all data received from crowdsourcing or wardriving on daily basis to generate neighbor list for each wireless transmitter. The server may compute the distance between each set of neighbor wireless transmitters based on their estimated locations, which may be used to determine if a wireless transmitter is mobile. For example, if the distances from a wireless transmitter to its neighbors changes over time, e.g., more than a predetermined threshold, the wireless transmitter may be identified as mobile. Additionally or alternatively, if a wireless transmitter is associated with different sets of neighbors over different scans, e.g., as reported by one or more mobile devices, the wireless transmitter may be identified as mobile.

In client based detection of a mobile wireless transmitter using neighbor relationships, the mobile device 102 may receive assistance data from the server 110 that may include the positions of wireless transmitters and may include the distances between wireless transmitters. The mobile device 102 may verify that the observed positions of the wireless transmitters and/or the distances between wireless transmitters are consistent with the information provided in the assistance data. If there are inconsistencies and/or the inconsistencies are greater than a predetermined threshold, the wireless transmitter may be identified as mobile and the mobile device 102 may ignore observation scans from a suspected mobile wireless transmitter and may report the suspected mobile wireless transmitter to the server 110. Additionally, if the mobile device 102 is performing crowdsourcing or wardriving, the mobile device 102 may generate neighbor relations for the entire duration of the data acquisition. The mobile device 102 may use the neighbor list to identify a mobile wireless transmitter, e.g., by identifying a wireless transmitter having multiple sets of neighbors that are separated by distances greater than a configured threshold.

Figure 3:
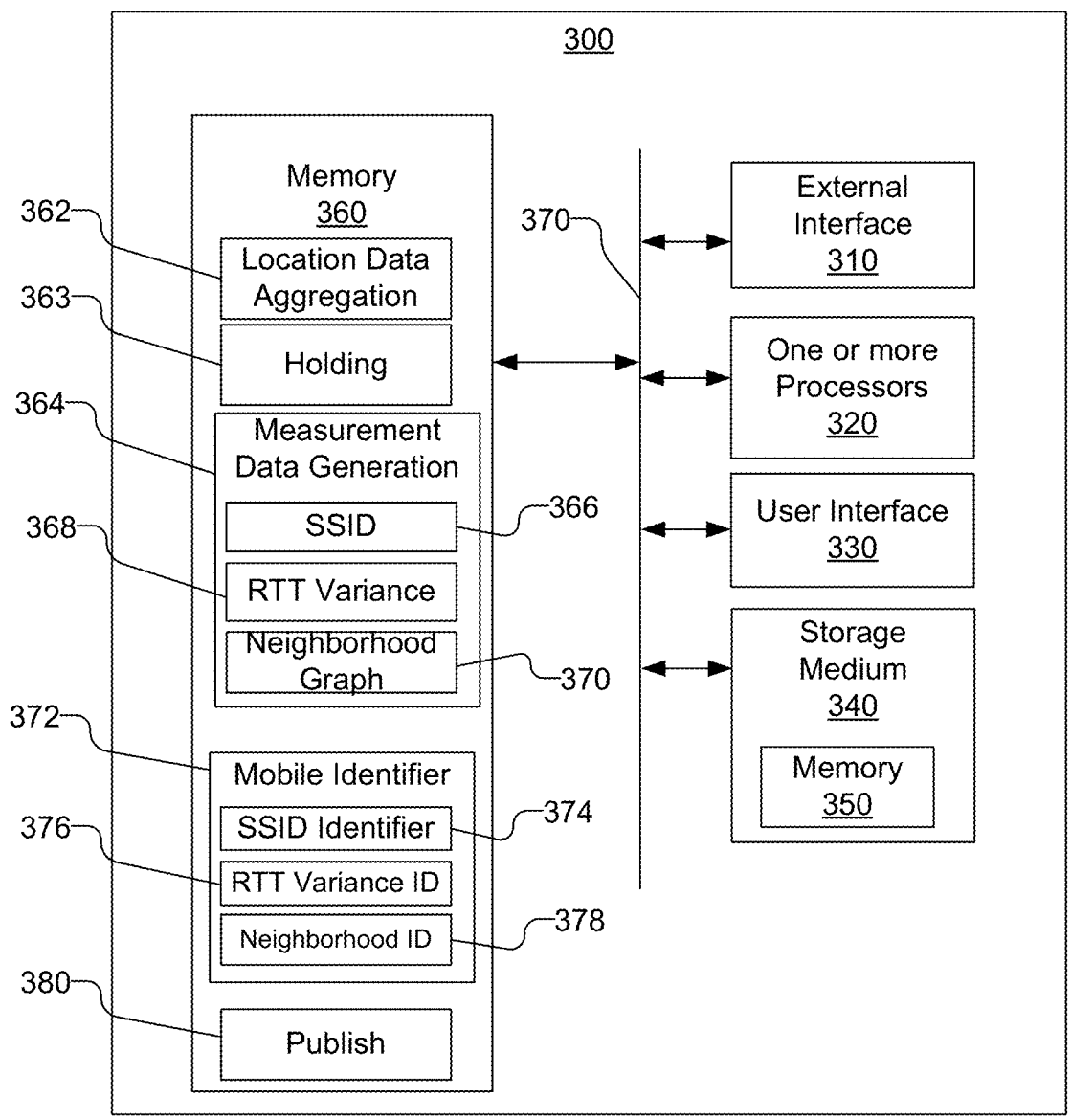
FIG. 3 is a block diagram of a server capable of eliminating mobile wireless transmitters from crowdsourced or wardriving data.

FIG. 3 is a block diagram of an apparatus 300 capable of identifying mobile wireless transmitters in crowdsourced or wardriving data. The apparatus 300 may be, e.g., the server 110 or a mobile device 102. The apparatus 300 includes an external interface 310 that is capable of receiving location data. For example, if apparatus 300 is server 110, the external interface 310 may communicate with mobile devices 102, 104, 112, e.g., through the wireless networks 101A, 101B shown in FIG. 1, to obtain the location data from the mobile devices 102, 104. Additionally, the apparatus 300 may use the external interface 310 to publish the almanac database, i.e., to either provide to mobile device 112 or other servers or to use the almanac database (or a portion thereof) for position determination of the mobile device 112. If apparatus 300 is mobile device 102, the external interface 310 may communicate with wireless transmitters to receive location measurements, e.g., RTI and/or RSSI information and may communicate with the server 110 to receive assistance data, including locations of and/or distances between wireless transmitters. The external interface 310 may include one or more separate interface devices. For example, the external interface 310 may include a wired interface that is coupled to a router (not shown) and/or a wireless interface that may support wireless communication such as using GSM, WCDMA, LTE, CDMA, HRPD, WiFi, BT, WiMax, etc., or wireless communication using a wireless LAN (WLAN), DSL or packet cable, for example. The apparatus 300 may further include a user interface 330 that may include e.g., a display, as well as a keypad or other input device through which the user can input information into the apparatus 300.

The apparatus 300 includes one or more processors 320 and memory 360, which may be coupled together with bus 370. The one or more processors 320 and other components of the apparatus 300 may similarly be coupled together with bus 370, a separate bus, or may be directly connected together or a combination of the foregoing. The memory 360 may contain executable code or software instructions that when executed by the one or more processors 320 cause the one or more processors 320 to operate as a special purpose computer programmed to perform the procedures and techniques disclosed herein (e.g. such as the process flow 200). As illustrated in FIG. 3, the memory 360 includes one or more components or modules that when implemented by the one or more processors 320 implements the methodologies described herein. While the components or modules are illustrated as software in memory 360 that is executable by the one or more processors 320, it should be understood that the components or modules may be dedicated hardware either in the processors 320 or off processor.

As illustrated, the memory 360 may include a location request receive unit 1512 that when that when implemented by the one or more processors 320 enables the one or more processors 320 to receive, via the external interface 310, and process a periodic or triggered location request transmitted by a first core network (CN) node in the wireless network, such as AMF 154.

As illustrated, the memory 360 includes a location data aggregation unit 362 that when implemented by the one or more processors 320 enables the one or more processors 320 to receive the location data for a plurality of wireless transmitters from a plurality of mobile devices. A holding unit 363 when implemented by the one or more processors 320 configures the one or more processors 320 to hold the location data, e.g., in memory 350, for a period of time, e.g., either for a predetermined time period or until a threshold amount of location data is received, while additional location data is received for the plurality of wireless transmitters.

The memory 360 includes a measurement data unit 364 that when implemented by the one or more processors 320 configures the one or more processors 320 to generate sets of measurement data for each wireless transmitter in the plurality of wireless transmitters, wherein a set of measurement data for each wireless transmitter is generated using the location data and the additional location data received for the plurality of wireless transmitters. For example, the measurement data unit 364 may include a Service Set Identifier (SSID) unit 366 that when implemented by the one or more processors 320 configures the one or more processors 320 to obtain the SSID for each wireless transmitter from the received location data. The measurement data unit 364 may include an RRT variance unit 368 that when implemented by the one or more processors 320 configures the one or more processors 320 to generate the RTT and record any variance in RTT for each wireless transmitter using the received location data. The measurement data unit 364 may include a neighbor relationship graph unit 370 that when implemented by the one or more processors 320 configures the one or more processors 320 to generate a neighbor relationship graph for each wireless transmitter using the received location data.

The memory 360 includes a mobile wireless transmitter identifier unit 372 that when implemented by the one or more processors 320 configures the one or more processors 320 to identify a mobile wireless transmitter in the plurality of wireless transmitters using the sets of measurement data, such as the SSID for each wireless transmitter, the RTT variance for each mobile wireless transmitter, and the neighbor relationship graph for each wireless transmitter. For example, the mobile wireless transmitter identifier unit 372 may include an SSID identifier unit 374, that when implemented by the one or more processors 320 configures the one or more processors 320 to analyze the SSID of each wireless transmitter to determine if the SSID identifies the wireless transmitter as a mobile Hotspot. The mobile wireless transmitter identifier unit 372 may include a RTT variance ID unit 376 that when implemented by the one or more processors 320 configures the one or more processors 320 to determine whether the RTT variance for a wireless transmitter indicates that the wireless transmitter is mobile, e.g., by exceeding a predetermined threshold. The mobile wireless transmitter identifier unit 372 may include a neighborhood relationship graph ID unit 378 that when implemented by the one or more processors 320 configures the one or more processors 320 to whether the spread of the neighborhood relationship graph for each wireless transmitter indicates that the wireless transmitter is mobile, e.g., the spread is greater than a predetermined threshold.

The memory 360 may include a publishing unit 380 that when implemented by the one or more processors 320 configures the one or more processors 320 to publish an almanac database based on the received location data received for the plurality of wireless transmitters, but either identifies or excludes any wireless transmitter determined to be mobile. The publishing unit 380, for example, may configured the one or more processors 320 to use the almanac database (or a portion thereof) for position determination of a mobile device or to cause the external interface to provide the almanac database to mobile devices or other servers for use. For example, the almanac database may be stored in storage medium 340 or a separate database.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 360, and are configured to cause the one or more processors to operate as a special purpose computer programmed to perform the algorithms disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, an apparatus for producing an almanac database of wireless transmitters may include a means for receiving location data for a plurality of wireless transmitters, the location data obtained from a plurality of mobile devices through crowdsourcing or wardriving, which may be, e.g., the external interface 310 and one or more processors 320 with dedicated hardware or implementing executable code or software instructions in memory 360 such as the location data aggregation unit 362. A means for holding the location data while receiving additional location data for the plurality of wireless transmitters for a period of time may be, e.g., the one or more processors 320 with dedicated hardware or implementing executable code or software instructions in memory 360 such as the holding unit 363. A means for generating sets of measurement data for each wireless transmitter in the plurality of wireless transmitters using the location data and the additional location data received for the plurality of wireless transmitters, wherein the sets of measurement data for each wireless transmitter comprise at least one of a Service Set Identifier (SSID) for each wireless transmitter, a round trip time (RTT) variance for each wireless transmitter, and a neighbor relationship graph for each wireless transmitter, may be, e.g., the one or more processors 320 with dedicated hardware or implementing executable code or software instructions in memory 360 such as the measurement data generation unit 364. A means for identifying a mobile wireless transmitter in the plurality of wireless transmitters using at least the SSID for each wireless transmitter, the RTT variance for each mobile wireless transmitter, and the neighbor relationship graph for each wireless transmitter may be, e.g., the one or more processors 320 with dedicated hardware or implementing executable code or software instructions in memory 360 such as the mobile wireless transmitter identifier unit 372. A means for publishing the almanac database after the period of time using the location data and the additional location data received for the plurality of wireless transmitters, wherein the almanac database identifies the mobile wireless transmitter or excludes the mobile wireless transmitter may be, e.g., the external interface 310 and the one or more processors 320 with dedicated hardware or implementing executable code or software instructions in memory 360 such as the publish unit 380.

In one aspect, the means for generating sets of measurement data for each wireless transmitter may include means for obtaining the SSID for each wireless transmitter from the location data and the additional location data, which may be, e.g., the one or more processors 320 with dedicated hardware or implementing executable code or software instructions in memory 360 such as the SSID unit 366. The means for identifying the mobile wireless transmitter may include means for determining the SSID for a wireless transmitter identifies that wireless transmitter as a mobile Hotspot, which may be, e.g., the one or more processors 320 with dedicated hardware or implementing executable code or software instructions in memory 360 such as the SSID identifier unit 374.

In one aspect, the means for generating sets of measurement data for each wireless transmitter may include means for generating the RTT variance for each wireless transmitter from the location data and the additional location data, which may be, the one or more processors 320 with dedicated hardware or implementing executable code or software instructions in memory 360 such as the RTT variance unit 372. The means for identifying the mobile wireless transmitter may include means for determining that the RTT variance for a wireless transmitter indicates that the wireless transmitter is mobile, which may be, e.g., the one or more processors 320 with dedicated hardware or implementing executable code or software instructions in memory 360 such as the RTT variance identifier unit 372. For example, the means for determining that the RTT variance for the wireless transmitter indicates that the wireless transmitter is mobile may include means for determining the RTT variance for the wireless transmitter is greater than a predetermined threshold, which may be, e.g., the one or more processors 320 with dedicated hardware or implementing executable code or software instructions in memory 360 such as the RTT variance identifier unit 372.

In one aspect, the means for generating sets of measurement data for each wireless transmitter may include means for generating the neighbor relationship graph for each wireless transmitter from the location data and the additional location data and determining a spread of the neighbor relationship graph for each wireless transmitter, which may be, e.g., the one or more processors 320 with dedicated hardware or implementing executable code or software instructions in memory 360 such as the neighborhood relationship graph unit 370. The means for identifying the mobile wireless transmitter may include means for determining the spread of the neighbor relationship graph for a wireless transmitter indicates that the wireless transmitter is mobile, which may be, e.g., the one or more processors 320 with dedicated hardware or implementing executable code or software instructions in memory 360 such as the neighborhood relationship graph identifier unit 372. For example, the means for determining the spread of the neighbor relationship graph for the wireless transmitter indicates that the wireless transmitter is mobile may include the means for determining the spread of the neighbor relationship graph is greater than a predetermined threshold, which may be, e.g., the one or more processors 320 with dedicated hardware or implementing executable code or software instructions in memory 360 such as the neighborhood relationship graph identifier unit 372.

In one aspect, the means for holding the location data while receiving the additional location data for the plurality of wireless transmitters may include means for holding the location data for a predetermined time period or holding the location data until a threshold amount of location data is received, which may be, e.g., memory 350 and the one or more processors 320 with dedicated hardware or implementing executable code or software instructions in memory 360 such as the holding unit 363.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method for producing an almanac database of wireless transmitters comprising:
   receiving location data for a plurality of wireless transmitters, the location data obtained from a plurality of mobile devices through crowdsourcing or wardriving;
   holding the location data while receiving additional location data for the plurality of wireless transmitters for a period of time;
   determining distances between each set of neighbor wireless transmitters for each wireless transmitter in the plurality of wireless transmitters using the location data and the additional location data received for the plurality of wireless transmitters;
   identifying a mobile wireless transmitter in the plurality of wireless transmitters using the distances between each set of neighbor wireless transmitters; and
   publishing the almanac database after the period of time using the location data and the additional location data received for the plurality of wireless transmitters, wherein the almanac database identifies the mobile wireless transmitter or excludes the mobile wireless transmitter.

2. The method of claim 1, wherein the distances between each set of neighbor wireless transmitters are determined based on estimated locations of each wireless transmitter generated using the location data and additional location data from the plurality of mobile devices, wherein identifying the mobile wireless transmitter comprises determining a change in distance between the mobile wireless transmit and at least one neighbor wireless transmitter.

3. The method of claim 2, wherein identifying the mobile wireless transmitter comprises determining the change in distance between the mobile wireless transmit and the at least one neighbor wireless transmitter is greater than a predetermined threshold.

4. The method of claim 1, wherein holding the location data while receiving the additional location data for the plurality of wireless transmitters comprises holding the location data for a predetermined time period or holding the location data until a threshold amount of location data is received.

5. An apparatus for producing an almanac database of wireless transmitters comprising:
   an external interface capable of communicating with a plurality of mobile devices;
   a memory to store instructions; and
   at least one processor coupled to the external interface and the memory and configured to:
   receive location data for a plurality of wireless transmitters, the location data obtained from the plurality of mobile devices through crowdsourcing or wardriving;
   hold the location data while receiving additional location data for the plurality of wireless transmitters for a period of time;
   determine distances between each set of neighbor wireless transmitters for each wireless transmitter in the plurality of wireless transmitters using the location data and the additional location data received for the plurality of wireless transmitters;

identify a mobile wireless transmitter in the plurality of wireless transmitters using the distances between each set of neighbor wireless transmitters; and publish the almanac database after the period of time using the location data and the additional location data received for the plurality of wireless transmitters, wherein the almanac database identifies the mobile wireless transmitter or excludes the mobile wireless transmitter.

6. The apparatus of claim 5, wherein the at least one processor is configured to determine the distances between each set of neighbor wireless transmitters based on estimated locations of each wireless transmitter generated using the location data and additional location data from the plurality of mobile devices, wherein the at least one processor is configured to identify the mobile wireless transmitter by being configured to determine a change in distance between the mobile wireless transmit and at least one neighbor wireless transmitter.

7. The apparatus of claim 6, wherein the at least one processor is configured to identify the mobile wireless transmitter by being configured to determine the change in distance between the mobile wireless transmit and the at least one neighbor wireless transmitter is greater than a predetermined threshold.

8. The apparatus of claim 5, wherein the at least one processor is configured to hold the location data while receiving the additional location data for the plurality of wireless transmitters by being configured to hold the location data for a predetermined time period or holding the location data until a threshold amount of location data is received.

9. An apparatus for producing an almanac database of wireless transmitters comprising:

means for receiving location data for a plurality of wireless transmitters, the location data obtained from a plurality of mobile devices through crowdsourcing or wardriving;

means for holding the location data while receiving additional location data for the plurality of wireless transmitters for a period of time;

means for determining distances between each set of neighbor wireless transmitters for each wireless transmitter in the plurality of wireless transmitters using the location data and the additional location data received for the plurality of wireless transmitters;

means for identifying a mobile wireless transmitter in the plurality of wireless transmitters using the distances between each set of neighbor wireless transmitters; and means for publishing the almanac database after the period of time using the location data and the additional location data received for the plurality of wireless transmitters, wherein the almanac database identifies the mobile wireless transmitter or excludes the mobile wireless transmitter.

10. The apparatus of claim 9, wherein the means for determining distances between each set of neighbor wireless transmitters for each wireless transmitter determines the distances between each set of neighbor wireless transmitters based on estimated locations of each wireless transmitter generated using the location data and additional location data from the plurality of mobile devices, wherein the means for identifying the mobile wireless transmitter determines a change in distance between the mobile wireless transmit and at least one neighbor wireless transmitter.

11. The apparatus of claim 10, wherein the means identifying the mobile wireless transmitter determines the change in distance between the mobile wireless transmit and the at least one neighbor wireless transmitter.

12. The apparatus of claim 9, wherein the means for holding the location data while receiving the additional location data for the plurality of wireless transmitters comprises means for holding the location data for a predetermined time period or holding the location data until a threshold amount of location data is received.

13. A non-transitory storage medium including program code stored thereon, the program code is operable to cause at least one processor producing an almanac database of wireless transmitters to perform:

receiving location data for a plurality of wireless transmitters, the location data obtained from a plurality of mobile devices through crowdsourcing or wardriving;

holding the location data while receiving additional location data for the plurality of wireless transmitters for a period of time;

determining distances between each set of neighbor wireless transmitters for each wireless transmitter in the plurality of wireless transmitters using the location data and the additional location data received for the plurality of wireless transmitters;

identifying a mobile wireless transmitter in the plurality of wireless transmitters using the distances between each set of neighbor wireless transmitters; and publishing the almanac database after the period of time using the location data and the additional location data received for the plurality of wireless transmitters, wherein the almanac database identifies the mobile wireless transmitter or excludes the mobile wireless transmitter.

14. The non-transitory storage medium of claim 13, wherein the program code is operable to cause the at least one processor to determine the distances between each set of neighbor wireless transmitters based on estimated locations of each wireless transmitter generated using the location data and additional location data from the plurality of mobile devices wherein the program code is operable to cause the at least one processor to perform identifying the mobile wireless transmitter by causing the at least one processor determine a change in distance between the mobile wireless transmit and at least one neighbor wireless transmitter.

15. The non-transitory storage medium of claim 14, wherein the program code is operable to cause the at least one processor to perform identifying the mobile wireless transmitter by determining the change in distance between the mobile wireless transmit and the at least one neighbor wireless transmitter is greater than a predetermined threshold.

16. The non-transitory storage medium of claim 13, wherein the program code is operable to cause the at least one processor to perform holding the location data while receiving the additional location data for the plurality of wireless transmitters by causing the at least one processor to perform holding the location data for a predetermined time period or holding the location data until a threshold amount of location data is received.

* * * * *